United States Patent
Gao et al.

(10) Patent No.: US 9,713,030 B2
(45) Date of Patent: Jul. 18, 2017

(54) TRANSMISSION DATA PROCESSING METHOD AND DEVICES

(71) Applicant: HUAWEI TECHNOLOGIES CO., LTD., Shenzhen (CN)

(72) Inventors: Yongqiang Gao, Beijing (CN); Yuhua Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 14/851,351

(22) Filed: Sep. 11, 2015

(65) Prior Publication Data

US 2016/0007229 A1 Jan. 7, 2016

Related U.S. Application Data

(63) Continuation of application No. PCT/CN2013/072451, filed on Mar. 12, 2013.

(51) Int. Cl.
*H04W 24/00* (2009.01)
*H04W 72/04* (2009.01)
(Continued)

(52) U.S. Cl.
CPC ... *H04W 28/0278* (2013.01); *H04W 72/0413* (2013.01); *H04W 72/12* (2013.01);
(Continued)

(58) Field of Classification Search
CPC ......... H04W 28/0278; H04W 72/0413; H04W 76/021; H04W 72/12; H04W 88/02
See application file for complete search history.

(56) References Cited

U.S. PATENT DOCUMENTS

2008/0069053 A1* 3/2008 Kim .................. H04W 36/02
                                                    370/332
2009/0238120 A1   9/2009 Cai et al.
(Continued)

FOREIGN PATENT DOCUMENTS

CN   102037779   4/2011
CN   102369778   3/2012
(Continued)

OTHER PUBLICATIONS

International Search Report mailed Dec. 19, 2013, in corresponding International Application No. PCT/CN2013/072451.

*Primary Examiner* — Andrew Lee
(74) *Attorney, Agent, or Firm* — Staas & Halsey LLP

(57) ABSTRACT

Embodiments of the present invention provide a transmission data processing method and devices. The transmission data processing method includes: determining, by user equipment UE, processing indication information according to a type of buffered uplink data, and generating a buffer status report; and sending, by the UE, the buffer status report to a base station eNB, so that the eNB performs scheduling and uplink transmission resource allocation on the UE according to the processing indication information. The transmission data processing method and the devices provided in the embodiments of the present invention avoid a defect that air interface resources cannot be utilized appropriately and effectively when a granularity of a reported buffer status report is per logic channel group, thereby improving effects of scheduling and resource allocation that are performed on UE.

16 Claims, 5 Drawing Sheets

(51) Int. Cl.
*H04W 28/02* (2009.01)
*H04W 72/12* (2009.01)
*H04W 76/02* (2009.01)
*H04W 88/02* (2009.01)
*H04W 92/10* (2009.01)

(52) U.S. Cl.
CPC ..... *H04W 72/1284* (2013.01); *H04W 76/021* (2013.01); *H04W 88/02* (2013.01); *H04W 92/10* (2013.01)

(56) References Cited

U.S. PATENT DOCUMENTS

| | | | | |
|---|---|---|---|---|
| 2009/0285104 | A1* | 11/2009 | Tseng | H04W 72/1284 370/241 |
| 2009/0316637 | A1* | 12/2009 | Yi | H04W 72/10 370/329 |
| 2010/0085926 | A1* | 4/2010 | Harada | H04W 28/065 370/329 |
| 2010/0098011 | A1* | 4/2010 | Pelletier | H04W 72/1242 370/329 |
| 2011/0130099 | A1* | 6/2011 | Madan | H04W 72/1226 455/63.1 |
| 2012/0039263 | A1* | 2/2012 | Moberg | H04W 72/1284 370/329 |
| 2012/0307700 | A1* | 12/2012 | Nordberg | H04W 52/0206 370/311 |
| 2012/0307783 | A1 | 12/2012 | Torsner et al. | |
| 2013/0003583 | A1* | 1/2013 | Landstrom | H04B 7/0452 370/252 |
| 2013/0028201 | A1* | 1/2013 | Koo | H04W 72/1215 370/329 |
| 2013/0058220 | A1 | 3/2013 | Yi et al. | |
| 2013/0114445 | A1 | 5/2013 | Wen et al. | |
| 2013/0170469 | A1* | 7/2013 | Yu | H04L 1/0003 370/330 |
| 2014/0307674 | A1 | 10/2014 | Feuersaenger et al. | |
| 2015/0282213 | A1* | 10/2015 | Sun | H04W 72/0413 370/329 |

FOREIGN PATENT DOCUMENTS

| | | |
|---|---|---|
| CN | 102783234 | 11/2012 |
| WO | 2008/156402 A1 | 12/2008 |

* cited by examiner

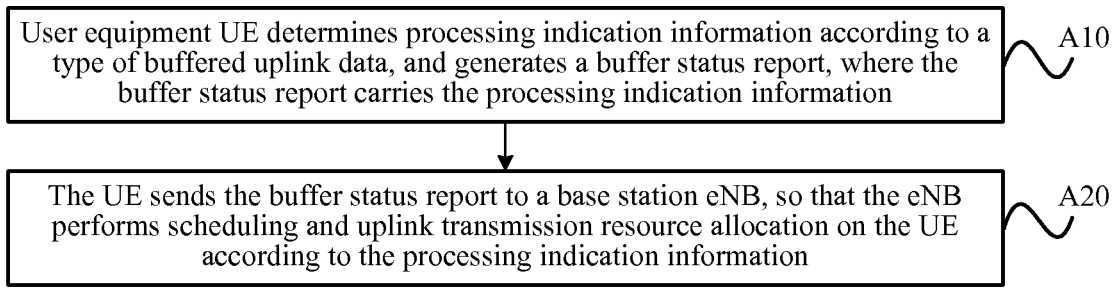
FIG. 1
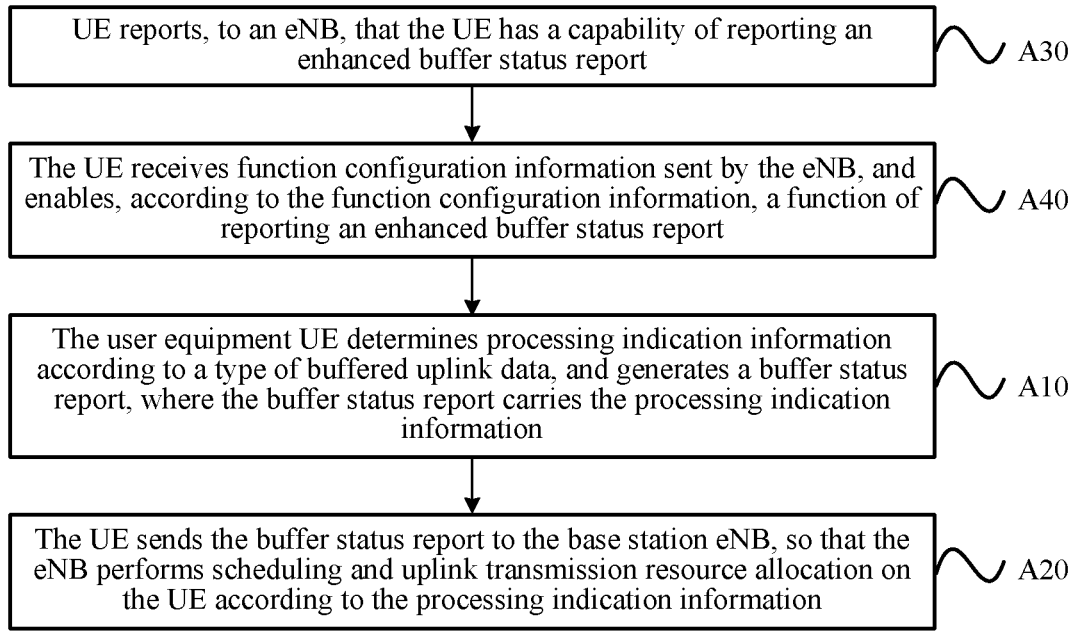
FIG. 2
| Logic channel group identity | Buffer size |
FIG. 3

| Buffer size of the 0<sup>th</sup> logic channel group | Buffer size of the 1<sup>st</sup> logic channel group |
|---|---|
| Buffer size of the 1<sup>st</sup> logic channel group | Buffer size of the 2<sup>nd</sup> logic channel group |
| Buffer size of the 2<sup>nd</sup> logic channel group | Buffer size of the 3<sup>rd</sup> logic channel group |

FIG. 4

| R | R | E | Logic channel identity |
|---|---|---|---|

FIG. 5

| R | 1 | E | Logic channel identity |
|---|---|---|---|

FIG. 6

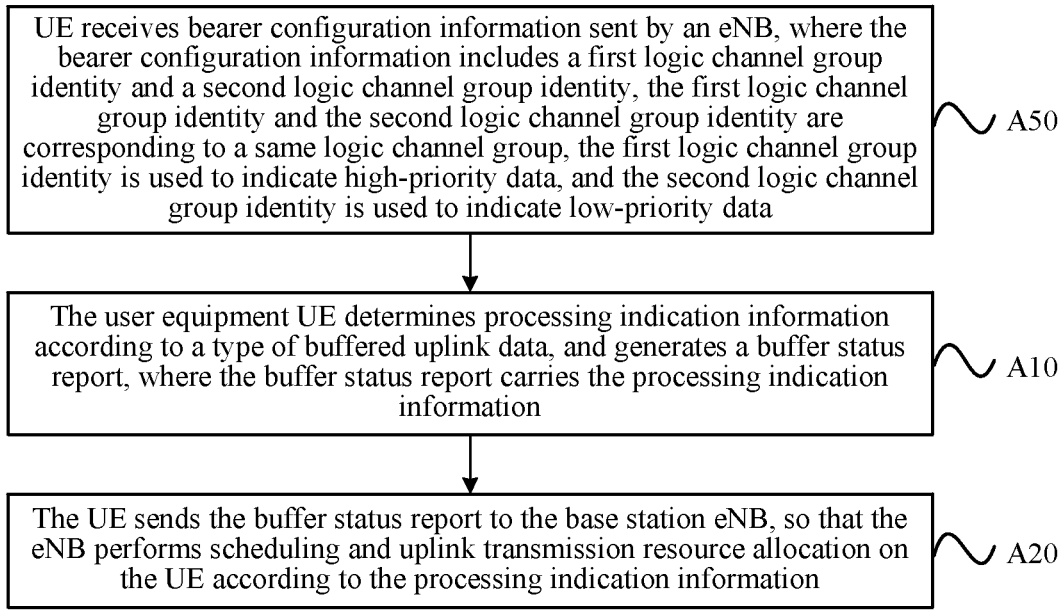
FIG. 7
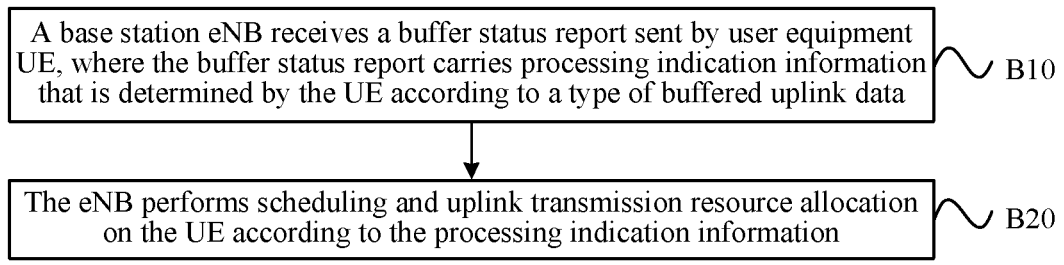
FIG. 8
FIG. 9

TRANSMISSION DATA PROCESSING METHOD AND DEVICES

CROSS-REFERENCE TO RELATED APPLICATIONS

This application is a continuation of International Application No. PCT/CN2013/072451, filed on Mar. 12, 2013, which is hereby incorporated by reference in its entirety.

TECHNICAL FIELD

Embodiments of the present invention relate to communications technologies, and in particular, to a transmission data processing method and devices.

BACKGROUND

In an long term evolution (LTE) communications system, an evolved NodeB (eNB) configures multiple radio bearers (RB) for user equipment (UE), where the bearers include a signaling bearer (SRB) and a data radio bearer (DRB). The eNB configures a corresponding parameter for each bearer (an SRB or a DRB), for example, configures priority related information of the bearer, a logic channel identity (LCID) of the bearer, and a logic channel group identity (LCG ID) of a logic channel group to which the bearer belongs. Generally, priorities of all bearers belonging to a same logic channel group are similar, and priorities among different logic channel groups are different.

To implement scheduling and sending of uplink data, the UE generally needs to report a volume of to-be-sent data to the eNB by using a buffer status report (BSR). However, in the prior art, a granularity of the BSR is generally per logic channel group, and the eNB can perform scheduling only according to a priority of the logic channel group, which is not precise enough, and causes that air interface resources cannot be utilized appropriately and effectively.

SUMMARY

Embodiments of the present invention provide a transmission data processing method and devices, to avoid a defect that air interface resources cannot be utilized appropriately and effectively when a granularity of a reported buffer status report is per logic channel group, and improve scheduling and resource allocation effect for UE.

According to a first aspect, an embodiment of the present invention provides a transmission data processing method, including:

determining, by user equipment UE, processing indication information according to a type of buffered uplink data, and generating a buffer status report, where the buffer status report carries the processing indication information; and sending, by the UE, the buffer status report to a base station eNB, so that the eNB performs scheduling and uplink transmission resource allocation on the UE according to the processing indication information.

In a first possible implementation manner, the determining, by user equipment UE, processing indication information according to a type of buffered uplink data, and generating a buffer status report includes:

if it is learned, by means of determining, that the buffered uplink data includes low-priority data, generating, by the UE, the buffer status report carrying processing indication information used to indicate that the uplink data is low-priority data.

In a second possible implementation manner, before the determining, by user equipment UE, processing indication information according to a type of buffered uplink data, the method further includes:

reporting, by the UE to the eNB, that the UE has a capability of reporting an enhanced buffer status report.

In a third possible implementation manner, before the determining, by user equipment UE, processing indication information according to a type of buffered uplink data, the method further includes:

receiving, by the UE, function configuration information sent by the eNB, and enabling, according to the function configuration information, a function of reporting an enhanced buffer status report.

With reference to the first possible implementation manner of the first aspect, in a fourth possible implementation manner, the buffer status report is a short buffer status report or a truncated buffer status report, the processing indication information is bit indication information, and content of a reserved bit of a Media Access Control MAC layer subheader in the buffer status report is the bit indication information.

With reference to the first possible implementation manner of the first aspect, in a fifth possible implementation manner, a quantity of logic channel groups configured by the eNB for the UE is one, and content of a logic channel group identity field of the buffer status report is the processing indication information.

With reference to the first possible implementation manner of the first aspect, in a sixth possible implementation manner, content of a logic channel identity field of a MAC layer subheader of the buffer status report is the processing indication information.

In a seventh possible implementation manner, before the determining, by user equipment UE, processing indication information according to a type of buffered uplink data, and generating a buffer status report, the method further includes:

receiving, by the UE, bearer configuration information sent by the eNB, where the bearer configuration information includes a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

With reference to the seventh possible implementation manner of the first aspect, in an eighth possible implementation manner, the processing indication information includes the second logic channel group identity; and the determining, by user equipment UE, processing indication information according to a type of buffered uplink data, and generating a buffer status report includes:

if it is learned, by means of determining, that the buffered uplink data includes low-priority data, generating, by the UE, a buffer status report carrying the second logic channel group identity.

With reference to the seventh possible implementation manner of the first aspect, in a ninth possible implementation manner, the processing indication information includes the first logic channel group identity and the second logic channel group identity; and the determining, by user equipment UE, processing indication information according to a type of buffered uplink data, and generating a buffer status report includes:

if it is learned, by means of determining, that the buffered uplink data includes the low-priority data and the high-priority data, generating, by the UE, a buffer status report carrying the first logic channel group identity and the second logic channel group identity.

With reference to the seventh possible implementation manner of the first aspect, in a tenth possible implementation manner, the processing indication information includes the first logic channel group identity; and the determining, by user equipment UE, processing indication information according to a type of buffered uplink data, and generating a buffer status report includes:

if it is learned, by means of determining, that the buffered uplink data is high-priority data, generating, by the UE, a buffer status report carrying the first logic signal group identity.

In an eleventh possible implementation manner, the processing indication information is a service type; and the determining, by user equipment UE, processing indication information according to a type of buffered uplink data, and generating a buffer status report includes:

determining, by the UE, a service type of the buffered uplink data, and generating a buffer status report carrying the service type.

According to a second aspect, an embodiment of the present invention provides a transmission data processing method, including:

receiving, by a base station eNB, a buffer status report sent by user equipment UE, where the buffer status report carries processing indication information that is determined by the UE according to a type of buffered uplink data; and performing, by the eNB, scheduling and uplink transmission resource allocation on the UE according to the processing indication information.

In a first possible implementation manner, the performing, by the eNB, scheduling and uplink transmission resource allocation on the UE according to the processing indication information includes:

if it is learned, by means of determining, that the processing indication information is used to indicate that the uplink data is low-priority data, performing, by the eNB, scheduling and uplink transmission resource allocation on the UE in a manner of processing low-priority data.

In a second possible implementation manner, the performing, by the eNB, scheduling and uplink transmission resource allocation on the UE according to the processing indication information includes:

if it is learned, by means of determining, that the processing indication information is used to indicate that the uplink data includes low-priority data and high-priority data, obtaining, by the eNB, from the buffer status report, a buffer capacity of the low-priority data and a buffer capacity of the high-priority data, and determining a policy according to the buffer capacity of the low-priority data and the buffer capacity of the high-priority data, to perform scheduling and uplink transmission resource allocation on the UE.

In a third possible implementation manner, the performing, by the eNB, scheduling and uplink transmission resource allocation on the UE according to the processing indication information includes:

if it is learned, by means of determining, that the processing indication information is used to indicate that the uplink data is high-priority data, performing, by the eNB, scheduling and uplink transmission resource allocation on the UE in a manner of processing high-priority data.

In a fourth possible implementation manner, the transmission data processing method further includes:

receiving, by the eNB, a downlink non-access stratum transmission message sent by a mobility management entity, where the downlink non-access stratum transmission message carries downlink data to be sent to the UE, and priority indication information/small data packet indication information that is corresponding to the downlink data; and performing, by the eNB, scheduling and downlink transmission resource allocation on the UE according to the priority indication information/small data packet indication information.

According to a third aspect, an embodiment of the present invention provides user equipment, including:

a processing unit, configured to determine processing indication information according to a type of buffered uplink data, and generate a buffer status report, where the buffer status report carries the processing indication information; and a sending unit, configured to send the buffer status report generated by the processing unit to a base station eNB, so that the eNB performs scheduling and uplink transmission resource allocation on the UE according to the processing indication information.

In a first possible implementation manner, the processing unit is further configured to: if it is learned, by means of determining, that the buffered uplink data includes low-priority data, generate the buffer status report carrying processing indication information used to indicate that the uplink data is low-priority data.

In a second possible implementation manner, the sending unit is further configured to report, to the eNB, that the UE has a capability of reporting an enhanced buffer status report.

In a third possible implementation manner, the user equipment further includes:

a receiving unit, configured to receive function configuration information sent by the eNB, and enable, according to the function configuration information, a function of reporting an enhanced buffer status report.

With reference to the first possible implementation manner of the third aspect, in a fourth possible implementation manner, the buffer status report is a short buffer status report or a truncated buffer status report, the processing indication information is bit indication information, and content of a reserved bit of a Media Access Control MAC layer subheader in the buffer status report is the bit indication information.

With reference to the first possible implementation manner of the third aspect, in a fifth possible implementation manner, a quantity of logic channel groups configured by the eNB for the UE is one, and content of a logic channel group identity field of the buffer status report is the processing indication information.

With reference to the first possible implementation manner of the third aspect, in a sixth possible implementation manner, content of a logic channel identity field of a MAC layer subheader of the buffer status report is the processing indication information.

In a seventh possible implementation manner, the user equipment further includes:

a receiving unit, configured to receive bearer configuration information sent by the eNB, where the bearer configuration information includes a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

With reference to the seventh possible implementation manner of the third aspect, in an eighth possible implementation manner, the processing indication information includes the second logic channel group identity; and the processing unit is further configured to: if it is learned, by means of determining, that the buffered uplink data includes low-priority data, generate a buffer status report carrying the second logic channel group identity.

With reference to the seventh possible implementation manner of the third aspect, in a ninth possible implementation manner, the processing indication information includes the first logic channel group identity and the second logic channel group identity; and the processing unit is further configured to: if it is learned, by means of determining, that the buffered uplink data includes the low-priority data and the high-priority data, generate a buffer status report carrying the first logic channel group identity and the second logic channel group identity.

With reference to the seventh possible implementation manner of the third aspect, in a tenth possible implementation manner, the processing indication information includes the first logic channel group identity; and the processing unit is further configured to: if it is learned, by means of determining, that the buffered uplink data is high-priority data, generate a buffer status report carrying the first logic signal group identity.

In an eleventh possible implementation manner, the processing indication information is a service type; and the processing unit is further configured to determine a service type of the buffered uplink data, and generate a buffer status report carrying the service type.

According to a fourth aspect, an embodiment of the present invention provides a base station, including:

a receiving unit, configured to receive a buffer status report sent by user equipment UE, where the buffer status report carries processing indication information that is determined by the UE according to a type of buffered uplink data; and a processing unit, connected to the receiving unit and configured to perform scheduling and uplink transmission resource allocation on the UE according to the processing indication information.

In a first possible implementation manner, the processing unit is further configured to: if it is learned, by means of determining, that the processing indication information is used to indicate that the uplink data is low-priority data, perform scheduling and uplink transmission resource allocation on the UE in a manner of processing low-priority data.

In a second possible implementation manner, the processing unit is further configured to: if it is learned, by means of determining, that the processing indication information is used to indicate that the uplink data includes low-priority data and high-priority data, obtain, from the buffer status report, a buffer capacity of the low-priority data and a buffer capacity of the high-priority data, and determine a policy according to the buffer capacity of the low-priority data and the buffer capacity of the high-priority data, to perform scheduling and uplink transmission resource allocation on the UE.

In a third possible implementation manner, the processing unit is further configured to: if it is learned, by means of determining, that the processing indication information is used to indicate that the uplink data is high-priority data, perform scheduling and uplink transmission resource allocation on the UE in a manner of processing high-priority data.

In a fourth possible implementation manner, the receiving unit is further configured to receive a downlink non-access stratum transmission message sent by a mobility management entity, where the downlink non-access stratum transmission message carries downlink data to be sent to the UE, and priority indication information/small data packet indication information that is corresponding to the downlink data; and the processing unit is further configured to perform scheduling and downlink transmission resource allocation on the UE according to the priority indication information/small data packet indication information.

According to a fifth aspect, an embodiment of the present invention provides user equipment, including:

a processor, configured to determine processing indication information according to a type of buffered uplink data, and generate a buffer status report, where the buffer status report carries the processing indication information; and a transmitter, configured to send the buffer status report generated by the processor to a base station eNB, so that the eNB performs scheduling and uplink transmission resource allocation on the UE according to the processing indication information.

In a first possible implementation manner, the processor is further configured to: if it is learned, by means of determining, that the buffered uplink data includes low-priority data, generate the buffer status report carrying processing indication information used to indicate that the uplink data is low-priority data.

In a second possible implementation manner, the transmitter is further configured to report, to the eNB, that the UE has a capability of reporting an enhanced buffer status report.

In a third possible implementation manner, the user equipment further includes:

a receiver, configured to receive function configuration information sent by the eNB, and enable, according to the function configuration information, a function of reporting an enhanced buffer status report.

With reference to the first possible implementation manner of the fifth aspect, in a fourth possible implementation manner, the buffer status report is a short buffer status report or a truncated buffer status report, the processing indication information is bit indication information, and content of a reserved bit of a Media Access Control MAC layer subheader in the buffer status report is the bit indication information.

With reference to the first possible implementation manner of the fifth aspect, in a fifth possible implementation manner, a quantity of logic channel groups configured by the eNB for the UE is one, and content of a logic channel group identity field of the buffer status report is the processing indication information.

With reference to the first possible implementation manner of the fifth aspect, in a sixth possible implementation manner, content of a logic channel identity field of a MAC layer subheader of the buffer status report is the processing indication information.

In a seventh possible implementation manner, the user equipment further includes:

a receiver, configured to receive bearer configuration information sent by the eNB, where the bearer configuration information includes a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

With reference to the seventh possible implementation manner of the fifth aspect, in an eighth possible implementation manner, the processing indication information includes the second logic channel group identity; and the processor is further configured to: if it is learned, by means of determining, that the buffered uplink data includes low-priority data, generate a buffer status report carrying the second logic channel group identity.

With reference to the seventh possible implementation manner of the fifth aspect, in a ninth possible implementation manner, the processing indication information includes the first logic channel group identity and the second logic channel group identity; and the processor is further configured to: if it is learned, by means of determining, that the buffered uplink data includes the low-priority data and the high-priority data, generate a buffer status report carrying the first logic channel group identity and the second logic channel group identity.

With reference to the seventh possible implementation manner of the fifth aspect, in a tenth possible implementation manner, the processing indication information includes the first logic channel group identity; and the processor is further configured to: if it is learned, by means of determining, that the buffered uplink data is high-priority data, generate a buffer status report carrying the first logic signal group identity.

In an eleventh possible implementation manner, the processing indication information is a service type; and the processor is further configured to determine a service type of the buffered uplink data, and generate a buffer status report carrying the service type.

According to a sixth aspect, an embodiment of the present invention provides a base station, including:

a receiver, configured to receive a buffer status report sent by user equipment UE, where the buffer status report carries processing indication information that is determined by the UE according to a type of buffered uplink data; and a processor, connected to the receiver and configured to perform scheduling and uplink transmission resource allocation on the UE according to the processing indication information.

In a first possible implementation manner, the processor is further configured to: if it is learned, by means of determining, that the processing indication information is used to indicate that the uplink data is low-priority data, perform scheduling and uplink transmission resource allocation on the UE in a manner of processing low-priority data.

In a second possible implementation manner, the processor is further configured to: if it is learned, by means of determining, that the processing indication information is used to indicate that the uplink data includes low-priority data and high-priority data, obtain, from the buffer status report, a buffer capacity of the low-priority data and a buffer capacity of the high-priority data, and determine a policy according to the buffer capacity of the low-priority data and the buffer capacity of the high-priority data, to perform scheduling and uplink transmission resource allocation on the UE.

In a third possible implementation manner, the processor is further configured to: if it is learned, by means of determining, that the processing indication information is used to indicate that the uplink data is high-priority data, perform scheduling and uplink transmission resource allocation on the UE in a manner of processing high-priority data.

In a fourth possible implementation manner, the receiver is further configured to receive a downlink non-access stratum transmission message sent by a mobility management entity, where the downlink non-access stratum transmission message carries downlink data to be sent to the UE, and priority indication information/small data packet indication information that is corresponding to the downlink data; and the processor is further configured to perform scheduling and downlink transmission resource allocation on the UE according to the priority indication information/small data packet indication information.

According to the transmission data processing method and the devices provided in the embodiments of the present invention, processing indication information is added into a buffer status report to be reported to an eNB, where the processing indication information is determined according to a type of uplink data, and can instruct the eNB to perform corresponding processing, thereby avoiding a defect that air interface resources cannot be utilized appropriately and effectively because when a granularity of a reported buffer status report is per logic channel group, the eNB performs scheduling and transmission resource allocation only according to a priority of the logic channel group, and the processing process is not precise enough, and improving effects of scheduling and resource allocation that are performed on UE.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a flowchart of a first transmission data processing method according to an embodiment of the present invention;

FIG. 2 is a flowchart of a second transmission data processing method according to an embodiment of the present invention;

FIG. 3 is s schematic diagram of a first buffer status report format according to an embodiment of the present invention;

FIG. 4 is a schematic diagram of a second buffer status report format according to an embodiment of the present invention;

FIG. 5 is a schematic diagram of a first subheader format according to an embodiment of the present invention;

FIG. 6 is a schematic diagram of a second subheader format according to an embodiment of the present invention;

FIG. 7 is a flowchart of a third transmission data processing method according to an embodiment of the present invention;

FIG. 8 is a schematic diagram of a third buffer status report format according to an embodiment of the present invention;

FIG. 9 is a flowchart of a fourth transmission data processing method according to an embodiment of the present invention;

DESCRIPTION OF EMBODIMENTS

Figure 10:
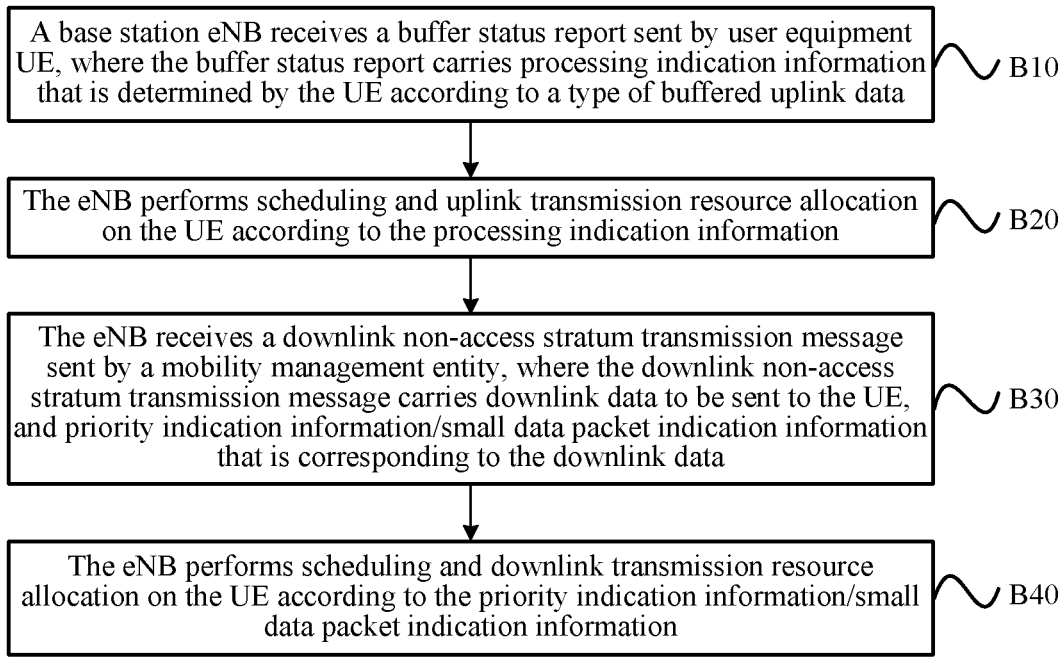
FIG. 10 is a flowchart of a fifth transmission data processing method according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

FIG. 1 is a flowchart of a first transmission data processing method according to an embodiment of the present invention. As shown in FIG. 1, the transmission data processing method provided in this embodiment may be specifically applied to but not limited to, for example, a data transmission process in an LTE communications system. The transmission data processing method provided in this embodiment specifically includes:

Step A10: UE determines processing indication information according to a type of buffered uplink data, and generates a buffer status report, where the buffer status report carries the processing indication information.

Step A20: The UE sends the buffer status report to an eNB, so that the eNB performs scheduling and uplink transmission resource allocation on the UE according to the processing indication information.

Specifically, the eNB presets multiple bearers for the UE, where the bearers include an SRB and a DRB. A quantity of DRBs may be zero, one, or multiple. For example:

SRB1: used to carry an radio resource control (RRC) message, and carry an non-access stratum (NAS) message before SRB2 is established;

SRB2: bearing an RRC message or an NAS message including a measurement log, where a priority of SRB2 is lower that of SRB1, and SRB2 can be configured only after being activated securely; and DRBn: bearing data of different priorities, where DRBn can be configured only after being activated securely.

The eNB configures corresponding parameters for each bearer, for example, configures priority related information of the bearer, a logic channel identity (LCID) of the bearer, and a logic channel group identity (LCG ID) of a logic channel group to which the bearer belongs. The configuration process may be specifically that the eNB sends corresponding parameter configuration information to the UE, and then the UE performs corresponding configuration according to the parameter configuration information.

During communication between UE and a network side, on different bearers, data that needs to be sent to a network arrives at a buffer of uplink data of the UE to wait for uplink scheduling, where the uplink data may be signaling, or may be service data. If being classified according to sizes of data packets, the service data may be classified into small data packets and large data packets; if being classified according to delay requirements, the service data may be classified into data packets with a relatively low delay requirement such as a machine-to-machine communication service data packet, and data packets with a relatively high delay requirement such as a voice service data packet; and if being classified according to bit error rate requirements, the service data may be classified into data packets with a relatively low bit error rate requirement, and data packets with a relatively high bit error rate requirement such as an internet protocol (IP) data packet. The types of the signaling, large data packets, data packets with a relatively high delay requirement, and data packets with a relatively high bit error rate requirement may all be high-priority data packets, and the types of the small data packets, data packet with a relatively low delay requirement, and data packets with a relatively low bit error rate requirement may all be low-priority data packets.

When the UE needs to send a buffer status report, the UE first determines a type of buffered uplink data, and determines corresponding processing indication information; and adds the processing indication information into the buffer status report and sends the buffer status report to the eNB, where the UE may add the processing indication information by using an existing field in the buffer status report. After receiving the buffer status report, the eNB may learn, according to the processing indication information in the buffer status report, a type of uplink data to be sent by the UE, and perform corresponding scheduling and uplink transmission resource allocation. Generally, UE that sends high-priority data is preferentially scheduled, and relatively sufficient uplink transmission resources are allocated, to ensure transmission of the high-priority data.

According to the transmission data processing method provided in this embodiment, processing indication information is added into a buffer status report to be reported to an eNB, where the processing indication information is determined according to a type of uplink data, and can instruct the eNB to perform corresponding processing, thereby avoiding a defect that air interface resources cannot be utilized appropriately and effectively because when a granularity of a reported buffer status report is per logic channel group, the eNB performs scheduling and transmission resource allocation only according to a priority of the logic channel group, and the processing process is not precise enough, and improving effects of scheduling and resource allocation that are performed on UE.

FIG. 2 is a flowchart of a second transmission data processing method according to an embodiment of the present invention. As shown in FIG. 2, before the determining, by the UE, processing indication information according to a type of buffered uplink data in step A10, the method further includes:

Step A30: The UE reports, to the eNB, that the UE has a capability of reporting an enhanced buffer status report.

In this embodiment, before the determining, by user equipment UE, processing indication information according to a type of buffered uplink data in step A10, the method further includes:

Step A40: The UE receives function configuration information sent by the eNB, and enables, according to the function configuration information, a function of reporting an enhanced buffer status report.

Specifically, the UE and the eNB may perform capability negotiation in advance, and the UE may report, to the eNB, that the UE has the capability of reporting an enhanced buffer status report, that is, the buffer status report reported by the UE carries processing indication information. The eNB may also configures the UE, so that the UE enables the function of reporting an enhanced buffer status report, where the configuration process may be specifically configuring a buffer status report format, so as to add the processing indication information into the buffer status report, where the buffer status report carrying the processing indication information may be referred to as an enhanced buffer status report. The foregoing processes in which the UE reports a capability to the eNB, and the eNB performs capability configuration on the UE may both be optional steps. Therefore, in an actual application, the following several scenarios may be included:

(1) the UE and the eNB first perform capability negotiation, and after agreeing on the negotiation, enable a configured buffer status report format;

(2) the UE and the eNB do not perform capability negotiation, the UE independently uses an enhanced buffer status report, and if the eNB can identify the buffer status report, the eNB acquires processing indication information at a corresponding location in the buffer status report to instruct to perform scheduling and uplink transmission resource allocation;

(3) the UE reports, to the eNB, that the UE has a capability of reporting an enhanced buffer status report, but the eNB does not need to perform configuration, the UE independently enables a function of reporting an enhanced buffer status report, to report an enhanced buffer status report, and if the eNB can identify the buffer status report, the eNB acquires processing indication information at a corresponding location in the buffer status report to instruct to perform scheduling and uplink transmission resource allocation; and (4) the UE performs capability reporting, the eNB performs configuration so that the UE uses an enhanced buffer status report, where if the UE has a function of reporting an enhanced buffer status report, the UE identifies the configuration, and uses the enhanced buffer status report; otherwise, the UE ignores the configuration, and does not use the enhanced buffer status report.

In an actual application process, a BSR media access control (MAC) control element (CE) generally has two formats:

(1) a short BSR/truncated BSR whose format is shown in FIG. 3, which provides only a buffer size (Buffer Size) of a logic channel group, where an LCG ID indicates a logic channel group whose buffer size is reported, and in an actual application, a length of the short BSR/truncated BSR may be one byte, and a length of the LCG ID may be two bits; and (2) a long BSR whose format is shown in FIG. 4, which may provide buffer sizes of four logic channel groups: buffer size #0, buffer size #1, buffer size #2 and buffer size #3, which respectively represent buffer sizes of the $0^{th}$ logic channel group, the $1^{st}$ logic channel group, the $2^{nd}$ logic channel group, and the $3^{rd}$ logic channel group, and in an actual application, a length of the long BSR may be three bytes.

Each type of BSR MAC CE is corresponding to a MAC layer subheader, and different LCIDs are used in the MAC layer subheaders for distinguishing. A format of the MAC layer subheader is shown in FIG. 5, and a length of the MAC layer subheader is one byte, where R is a reserved bit, and E is an extension bit.

In this embodiment, the determining, by UE, processing indication information according to a type of buffered uplink data, and generating a buffer status report in step A10 includes:

if it is learned, by means of determining, that the buffered uplink data includes low-priority data, generating, by the UE, the buffer status report carrying processing indication information used to indicate that the uplink data is low-priority data.

Specifically, a case in which the buffered uplink data includes low-priority data may include but not limited to the following several types:

(1) uplink data on SRB1 includes a small data packet, instead of only a signaling packet;

(2) background service data on a default bearer, instead of data packets of other delay-sensitive services such as a voice service and a video service;

(3) a machine-to-machine communication service data packet, with a relatively low delay requirement, on a machine communication bearer; or (4) a low-priority data packet indicated by a high layer.

When receiving the buffer status report, the eNB identifies that the processing indication information in the buffer status report indicates that uplink data to be sent by the UE is low-priority data, and may schedule the UE and allocate an uplink transmission resource according to a manner of processing low-priority data. In an actual processing process, for example, in buffer status reports that are sent by multiple UEs and received by the eNB, priorities corresponding to LCG IDs in the buffer status reports sent by two UEs are the same. For ease of description, the two UEs are referred to as the first UE and the second UE. A buffer status report reported by the first UE carries processing indication information indicating that the uplink data to be sent by the UE is low-priority data, and the eNB may preferentially schedule the second UE.

In an actual implementation process, the processing indication information may be carried by using the buffer status report in multiple manners, which are described in detail in the following embodiments. However, a person skilled in the art may understand that, the present invention is not limited thereto.

In this embodiment, the buffer status report is a short buffer status report or a truncated buffer status report, the processing indication information is bit indication information, and content of a reserved bit of a MAC layer subheader in the buffer status report is the bit indication information.

As shown in FIG. 6, in a first implementation manner, when the uplink data includes low-priority data, a reserved bit R, that is the second bit from left in a MAC layer subheader shown in FIG. 5 may be set to 1, and if the eNB identifies, in the MAC layer subheader, that the reserved bit R is set to 1, the eNB may learn that the uplink data to be sent by the UE includes low-priority data. Otherwise, the reserved bit R is 0.

In this embodiment, a quantity of logic channel groups configured by the eNB for the UE is one, and content of a logic channel group identity field of the buffer status report is the processing indication information.

Specifically, if the eNB configures only one logic channel group for the UE when configuring parameters for the UE, in such an application scenario, a logic channel group identity (LCG ID) may not be configured. In this case, processing indication information may be carried by using an LCG ID field. For example, it may be specified according to a protocol standard that when an LCG ID is 11, it indicates that the uplink data includes low-priority data. Then, when the uplink data includes low-priority data, the LCG ID is set to 11; otherwise, the LCG ID is set to 00.

In this embodiment, content of a logic channel identity field of a MAC layer subheader of the buffer status report is the processing indication information.

Specifically, the logic channel identity (LCID) in the MAC layer subheader is used only to distinguish different BSR MAC CEs, but is not used to identify a bearer; therefore, the processing indication information may be carried by using an LCID field. For example, it may be specified according to a protocol standard that when the LCID is 11000, it indicates that the uplink data includes low-priority data. Then, when the uplink data includes low-priority data, the LCID is set to 11000; otherwise, the LCID of the truncated BSR is 11100, the LCID of the short BSR is 11101, and the LCID of the long BSR is 11110.

FIG. 7 is a flowchart of a third transmission data processing method according to an embodiment of the present invention. As shown in FIG. 7, in this embodiment, before the determining, by UE, processing indication information according to a type of buffered uplink data in step A10, the method further includes:

Step A50. The UE receives bearer configuration information sent by the eNB, where the bearer configuration information includes a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

Specifically, the eNB may configure a bearer for the UE in multiple manners. In one configuration manner, for each bearer, an LCID of the bearer and an LCG ID of a logic channel group to which the bearer belongs may be first configured. For example, the LCG ID of the logic channel group to which the bearer belongs is a first LCG ID. The eNB may further add a second LCG ID that is corresponding to the first LCG ID into bearer configuration information as auxiliary information, and both the first LCG ID and the second LCG ID are corresponding to a logic channel group, where one LCG ID is used to indicate high-priority data, and the other LCG ID is used to indicate low-priority data. In another configuration manner, the eNB may configure two LCG IDs for the bearer, where one LCG ID is used to indicate high-priority data, the other LCG ID is used to indicate low-priority data, and two bearers with two same LCG IDs may be considered to belong to a same logic channel group by default. The UE may set an LCG ID field according to that the uplink data is high-priority data, or low-priority data, or includes both high-priority data and low-priority data.

In this embodiment, the processing indication information includes the second logic channel group identity. Correspondingly, the determining, by UE, processing indication information according to a type of buffered uplink data, and generating a buffer status report in step A10 includes:

if it is learned, by means of determining, that the buffered uplink data includes low-priority data, generating, by the UE, a buffer status report carrying the second logic channel group identity.

In this embodiment, the processing indication information includes the first logic channel group identity. Correspondingly, the determining, by UE, processing indication information according to a type of buffered uplink data, and generating a buffer status report in step A10 includes:

if it is learned, by means of determining, that the buffered uplink data is high-priority data, generating, by the UE, a buffer status report carrying the first logic signal group identity.

In this embodiment, the processing indication information includes the first logic channel group identity and the second logic channel group identity. Correspondingly, the determining, by UE, processing indication information according to a type of buffered uplink data, and generating a buffer status report in step A10 includes:

if it is learned, by means of determining, that the buffered uplink data includes the low-priority data and the high-priority data, generating, by the UE, a buffer status report carrying the first logic channel group identity and the second logic channel group identity.

Specifically, if the buffered uplink data includes both high-priority data and low-priority data, but only a short BSR/truncated BSR can be reported, a buffer size that is corresponding to the high-priority data or the low-priority data may be reported. For example, an LCG ID in a BSR that is corresponding to the high-priority data is set to "00", and an LCG ID in a BSR that is corresponding to the low-priority data is set to "01". If a long BSR is allowed to be reported, with reference to FIG. 4, for example, the eNB configures a logic channel group for the UE, and allocates LCG ID 0 and LCG ID 1. Values of buffer size #0 and buffer size #1 are set to be corresponding to buffer sizes of the high-priority data and the low-priority data, respectively. In this embodiment, the eNB does not configure LCG ID 2 and LCG ID 3 for the UE, and therefore, buffer size #2 and buffer size #3 are both set to 0.

In this embodiment, the processing indication information is a service type. The determining, by UE, processing indication information according to a type of buffered uplink data, and generating a buffer status report in step A10 includes:

determining, by the UE, a service type of the buffered uplink data, and generating a buffer status report carrying the service type.

Specifically, the service type of the uplink data may be pre-configured, and the service type is added into the buffer status report, to report a buffer size that is corresponding to each service type. The service type may be carried by using an original LCG ID field, as shown in FIG. 8.

FIG. 9 is a flowchart of a fourth transmission data processing method according to an embodiment of the present invention. As shown in FIG. 9, the transmission data processing method provided in this embodiment may be specifically implemented in cooperation with a method applied to UE, and specific implementation processes are not described again herein. The transmission data processing method provided in this embodiment specifically includes:

Step B10: An eNB receives a buffer status report sent by UE, where the buffer status report carries processing indication information that is determined by the UE according to a type of buffered uplink data.

Step B20: The eNB performs scheduling and uplink transmission resource allocation on the UE according to the processing indication information.

According to the transmission data processing method provided in this embodiment, processing indication information is added into a buffer status report to be reported to an eNB, where the processing indication information is determined according to a type of uplink data, and can instruct the eNB to perform corresponding processing, thereby avoiding a defect that air interface resources cannot be utilized appropriately and effectively because when a granularity of a reported buffer status report is per logic channel group, the eNB performs scheduling and transmission resource allocation only according to a priority of the logic channel group, and the processing process is not precise enough, and improving effects of scheduling and resource allocation that are performed on UE.

In this embodiment, the performing, by the eNB, scheduling and uplink transmission resource allocation on the UE according to the processing indication information in step B20 includes:

if it is learned, by means of determining, that the processing indication information is used to indicate that the uplink data is low-priority data, performing, by the eNB, scheduling and uplink transmission resource allocation on the UE in a manner of processing low-priority data.

In this embodiment, in step B20, the performing, by the eNB, scheduling and uplink transmission resource allocation on the UE according to the processing indication information includes:

if it is learned, by means of determining, that the processing indication information is used to indicate that the uplink data includes low-priority data and high-priority data, obtaining, by the eNB, from the buffer status report, a buffer capacity of the low-priority data and a buffer capacity of the high-priority data, and determining a policy according to the buffer capacity of the low-priority data and the buffer capacity of the high-priority data, to perform scheduling and uplink transmission resource allocation on the UE.

In this embodiment, in step B20, the performing, by the eNB, scheduling and uplink transmission resource allocation on the UE according to the processing indication information includes:

if it is learned, by means of determining, that the processing indication information is used to indicate that the uplink data is high-priority data, performing, by the eNB, scheduling and uplink transmission resource allocation on the UE in a manner of processing high-priority data.

FIG. 10 is a flowchart of a fifth transmission data processing method according to an embodiment of the present invention. As shown in FIG. 10, the transmission data processing method further includes:

Step B30: The eNB receives a downlink non-access stratum transmission message sent by a mobility management entity, where the downlink non-access stratum transmission message carries downlink data to be sent to the UE, and priority indication information/small data packet indication information that is corresponding to the downlink data.

Step B40: The eNB performs scheduling and downlink transmission resource allocation on the UE according to the priority indication information/small data packet indication information.

Specifically, when downlink data of the UE arrives, a mobility management entity (MME) adds the downlink data into a downlink NAS transmission message and send the downlink NAS transmission message to the eNB, where the downlink NAS (non-access stratum) transmission message further carries priority indication information or small data packet indication information, and the eNB may perform scheduling and downlink transmission resource allocation on the UE according to the priority indication information or small data packet indication information, to further avoid waste of air interface resources.

It should be noted that, there is no definite sequential relationship between step B30 and step B40, and step B10 and step B20.

Figure 11:
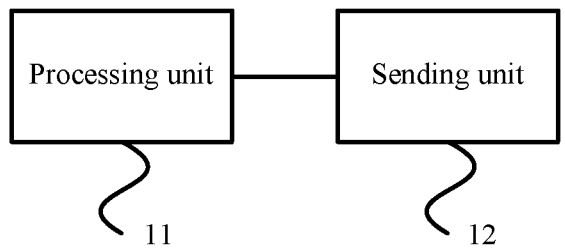
FIG. 11 is a schematic structural diagram of first user equipment according to an embodiment of the present invention.

FIG. 11 is a schematic structural diagram of first user equipment according to an embodiment of the present invention. As shown in FIG. 11, the user equipment provided in this embodiment can specifically implement steps of a transmission data processing method used by user equipment and provided in any embodiment of the present invention, and specific implementation processes are not described again herein. The user equipment provided in this embodiment specifically includes:

a processing unit 11, configured to determine processing indication information according to a type of buffered uplink data, and generate a buffer status report, where the buffer status report carries the processing indication information; and a sending unit 12, configured to send the buffer status report generated by the processing unit 11 to an eNB, so that the eNB performs scheduling and uplink transmission resource allocation on the UE according to the processing indication information.

According to the UE provided in this embodiment, processing indication information is added into a buffer status report to be reported to an eNB, where the processing indication information is determined according to a type of uplink data, and can instruct the eNB to perform corresponding processing, thereby avoiding a defect that air interface resources cannot be utilized appropriately and effectively because when a granularity of a reported buffer status report is per logic channel group, the eNB performs scheduling and transmission resource allocation only according to a priority of the logic channel group, and the processing process is not precise enough, and improving effects of scheduling and resource allocation that are performed on UE.

In this embodiment, the sending unit 12 is further configured to report, to the eNB, that the UE has a capability of reporting an enhanced buffer status report.

Figure 12:
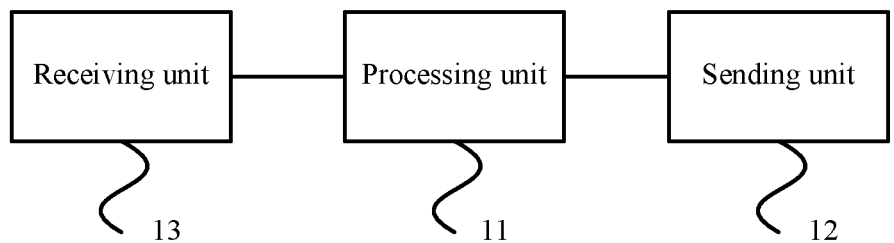
FIG. 12 is a schematic structural diagram of second user equipment according to an embodiment of the present invention.

FIG. 12 is a schematic structural diagram of second user equipment according to an embodiment of the present invention. As shown in FIG. 12, the user equipment further includes:

a receiving unit 13, configured to receive function configuration information sent by the eNB, and enable, according to the function configuration information, a function of reporting an enhanced buffer status report.

In this embodiment, the processing unit 11 is further configured to: if it is learned, by means of determining, that the buffered uplink data includes low-priority data, generate the buffer status report carrying processing indication information used to indicate that the uplink data is low-priority data.

In this embodiment, the buffer status report is a short buffer status report or a truncated buffer status report, the processing indication information is bit indication information, and content of a reserved bit of a MAC layer subheader in the buffer status report is the bit indication information.

In this embodiment, a quantity of logic channel groups configured by the eNB for the UE is one, and content of a logic channel group identity field of the buffer status report is the processing indication information.

In this embodiment, content of a logic channel identity field of a MAC layer subheader of the buffer status report is the processing indication information.

In this embodiment, the user equipment further includes:

a receiving unit, configured to receive bearer configuration information sent by the eNB, where the bearer configuration information includes a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

In this embodiment, the processing indication information includes the second logic channel group identity; and the processing unit 11 is further configured to: if it is learned, by means of determining, that the buffered uplink data includes low-priority data, generate a buffer status report carrying the second logic channel group identity.

In this embodiment, the processing indication information includes the first logic channel group identity and the second logic channel group identity; and the processing unit 11 is further configured to: if it is learned, by means of determining, that the buffered uplink data includes the low-priority data and the high-priority data, generate a buffer status report carrying the first logic channel group identity and the second logic channel group identity.

In this embodiment, the processing indication information includes the first logic channel group identity; and the processing unit 11 is further configured to: if it is learned, by means of determining, that the buffered uplink data is high-priority data, generate a buffer status report carrying the first logic signal group identity.

In this embodiment, the processing indication information is a service type; and the processing unit 11 is further configured to determine a service type of the buffered uplink data, and generate a buffer status report carrying the service type.

Figure 13:
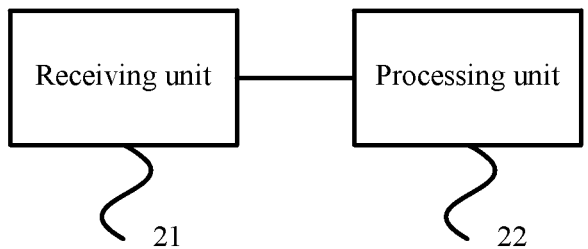
FIG. 13 is a schematic structural diagram of a first base station according to an embodiment of the present invention.

FIG. 13 is a schematic structural diagram of a first base station according to an embodiment of the present invention. As shown in FIG. 13, the base station provided in this embodiment can implement steps of a transmission data processing method applied to a base station and provided in any embodiment of the present invention, and specific implementation processes are not described again herein. The base station provided in this embodiment specifically includes:

a receiving unit 21, configured to receive a buffer status report sent by user equipment UE, where the buffer status report carries processing indication information that is determined by the UE according to a type of buffered uplink data; and a processing unit 22, connected to the receiving unit 21 and configured to perform scheduling and uplink transmission resource allocation on the UE according to the processing indication information.

According to the eNB provided in this embodiment, processing indication information is added into a buffer status report to be reported to an eNB, where the processing indication information is determined according to a type of uplink data, and can instruct the eNB to perform corresponding processing, thereby avoiding a defect that air interface resources cannot be utilized appropriately and effectively because when a granularity of a reported buffer status report is per logic channel group, the eNB performs scheduling and transmission resource allocation only according to a priority of the logic channel group, and the processing process is not precise enough, and improving effects of scheduling and resource allocation that are performed on UE.

In this embodiment, the processing unit 22 is further configured to: if it is learned, by means of determining, that the processing indication information is used to indicate that the uplink data is low-priority data, perform scheduling and uplink transmission resource allocation on the UE in a manner of processing low-priority data.

In this embodiment, the processing unit 22 is further configured to: if it is learned, by means of determining, that the processing indication information is used to indicate that the uplink data includes low-priority data and high-priority data, obtain, from the buffer status report, a buffer capacity of the low-priority data and a buffer capacity of the high-priority data, and determine a policy according to the buffer capacity of the low-priority data and the buffer capacity of the high-priority data, to perform scheduling and uplink transmission resource allocation on the UE.

In this embodiment, the processing unit 22 is further configured to: if it is learned, by means of determining, that the processing indication information is used to indicate that the uplink data is high-priority data, perform scheduling and uplink transmission resource allocation on the UE in a manner of processing high-priority data.

In this embodiment, the receiving unit 21 is further configured to receive a downlink non-access stratum transmission message sent by a mobility management entity, where the downlink non-access stratum transmission message carries downlink data to be sent to the UE, and priority indication information/small data packet indication information that is corresponding to the downlink data. The processing unit 22 is further configured to perform scheduling and downlink transmission resource allocation on the UE according to the priority indication information/small data packet indication information.

Figure 14:
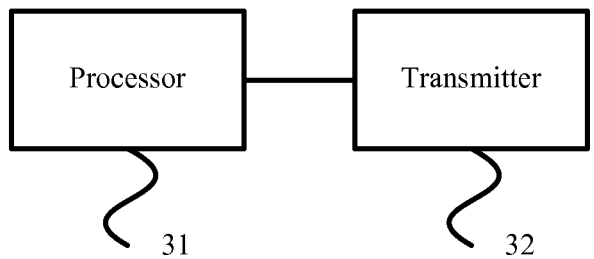
FIG. 14 is a schematic structural diagram of third user equipment according to an embodiment of the present invention.

FIG. 14 is a schematic structural diagram of third user equipment according to an embodiment of the present invention. As shown in FIG. 14, the user equipment provided in this embodiment can specifically implement steps of a transmission data processing method used by user equipment and provided in any embodiment of the present invention, and specific implementation processes are not described again herein. The user equipment provided in this embodiment specifically includes:

a processor 31, configured to determine processing indication information according to a type of buffered uplink data, and generate a buffer status report, where the buffer status report carries the processing indication information; and a transmitter 32, configured to send the buffer status report generated by the processor 31 to a base station eNB, so that the eNB performs scheduling and uplink transmission resource allocation on the UE according to the processing indication information.

In this embodiment, the transmitter 32 is further configured to report, to the eNB, that the UE has a capability of reporting an enhanced buffer status report.

Figure 15:
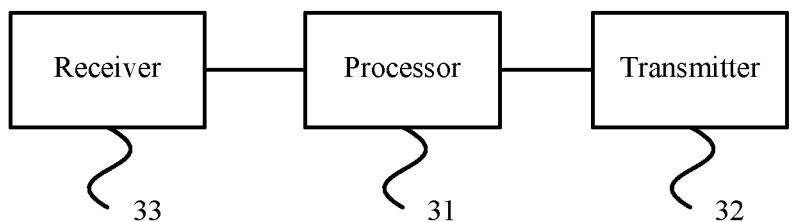
FIG. 15 is a schematic structural diagram of fourth user equipment according to an embodiment of the present invention.

FIG. 15 is a schematic structural diagram of fourth user equipment according to an embodiment of the present invention. As shown in FIG. 15, the user equipment further includes:

a receiver 33, configured to receive function configuration information sent by the eNB, and enable, according to the function configuration information, a function of reporting an enhanced buffer status report.

In this embodiment, the processor 31 is further configured to: if it is learned, by means of determining, that the buffered uplink data includes low-priority data, generate the buffer status report carrying processing indication information used to indicate that the uplink data is low-priority data.

In this embodiment, the buffer status report is a short buffer status report or a truncated buffer status report, the processing indication information is bit indication information, and content of a reserved bit of a MAC layer subheader in the buffer status report is the bit indication information.

In this embodiment, a quantity of logic channel groups configured by the eNB for the UE is one, and content of a logic channel group identity field of the buffer status report is the processing indication information.

In this embodiment, content of a logic channel identity field of a MAC layer subheader of the buffer status report is the processing indication information.

In this embodiment, the user equipment further includes: a receiver, configured to receive bearer configuration information sent by the eNB, where the bearer configuration information includes a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

In this embodiment, the processing indication information includes the second logic channel group identity; and the processor 31 is further configured to: if it is learned, by means of determining, that the buffered uplink data includes low-priority data, generate a buffer status report carrying the second logic channel group identity.

In this embodiment, the processing indication information includes the first logic channel group identity and the second logic channel group identity; and the processor 31 is further configured to: if it is learned, by means of determining, that the buffered uplink data includes the low-priority data and the high-priority data, generate a buffer status report carrying the first logic channel group identity and the second logic channel group identity.

In this embodiment, the processing indication information includes the first logic channel group identity; and the processor 31 is further configured to: if it is learned, by means of determining, that the buffered uplink data is high-priority data, generate a buffer status report carrying the first logic signal group identity.

In this embodiment, the processing indication information is a service type; and the processor 31 is further configured to determine a service type of the buffered uplink data, and generate a buffer status report carrying the service type.

Figure 16:
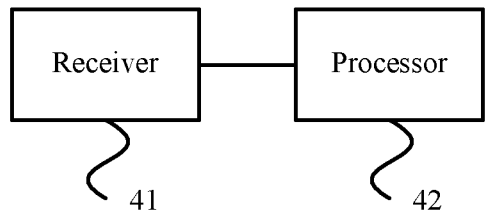
FIG. 16 is a schematic structural diagram of a second base station according to an embodiment of the present invention.

FIG. 16 is a schematic structural diagram of a second base station according to an embodiment of the present invention. As shown in FIG. 16, the base station provided in this embodiment can implement steps of a transmission data processing method applied to the base station and provided in any embodiment of the present invention, and specific implementation processes are not described again herein. The base station provided in this embodiment specifically includes:

a receiver 41, configured to receive a buffer status report sent by user equipment UE, where the buffer status report carries processing indication information that is determined by the UE according to a type of buffered uplink data; and a processor 42, connected to the receiver 41 and configured to perform scheduling and uplink transmission resource allocation on the UE according to the processing indication information.

In this embodiment, the processor 42 is further configured to: if it is learned, by means of determining, that the processing indication information is used to indicate that the uplink data is low-priority data, perform scheduling and uplink transmission resource allocation on the UE in a manner of processing low-priority data.

In this embodiment, the processor 42 is further configured to: if it is learned, by means of determining, that the processing indication information is used to indicate that the uplink data includes low-priority data and high-priority data, obtain, from the buffer status report, a buffer capacity of the low-priority data and a buffer capacity of the high-priority data, and determine a policy according to the buffer capacity of the low-priority data and the buffer capacity of the high-priority data, to perform scheduling and uplink transmission resource allocation on the UE.

In this embodiment, the processor 42 is further configured to: if it is learned, by means of determining, that the processing indication information is used to indicate that the uplink data is high-priority data, perform scheduling and uplink transmission resource allocation on the UE in a manner of processing high-priority data.

In this embodiment, the receiver 41 is further configured to receive a downlink non-access stratum transmission message sent by a mobility management entity, where the downlink non-access stratum transmission message carries downlink data to be sent to the UE, and priority indication information/small data packet indication information that is corresponding to the downlink data. The processor 42 is further configured to perform scheduling and downlink transmission resource allocation on the UE according to the priority indication information/small data packet indication information.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as these modifications or replacements do not cause the essence of the technical solutions to depart from the scope of the technical solutions of the embodiments of the present invention.

What is claimed is:

1. A transmission data processing method, comprising:
receiving, by user equipment (UE), bearer configuration information sent by an evolved NodeB (eNB), wherein the bearer configuration information indicates high-priority data and low-priority data;
determining, by the user equipment (UE), processing indication information according to a type of buffered uplink data, and generating a buffer status report (BSR), wherein the BSR carries the processing indication information, and, if the buffered uplink data comprises low-priority data, generating, by the UE, the BSR carrying processing indication information used to indicate that the uplink data is low-priority data; and
sending, by the UE, the BSR to the evolved NodeB (eNB), so that the eNB performs scheduling and uplink transmission resource allocation on the UE according to the processing indication information.

2. The transmission data processing method according to claim 1, wherein the BSR is a short BSR or a truncated BSR, the processing indication information is bit indication information, and content of a reserved bit of a Media Access Control (MAC) layer subheader in the BSR is the bit indication information.

3. The transmission data processing method according to claim 1, wherein content of a logic channel identity field of a MAC layer subheader of the BSR is the processing indication information.

4. The transmission data processing method according to claim 1, wherein the low-priority data comprises:
   a machine-to-machine communication service data packet, with a low delay requirement, on a machine communication bearer.

5. A transmission data processing method, comprising:
   determining, by user equipment (UE), processing indication information according to a type of buffered uplink data, and generating a buffer status report (BSR), wherein the BSR carries the processing indication information; and
   sending, by the UE, the BSR to an evolved NodeB (eNB), so that the eNB performs scheduling and uplink transmission resource allocation on the UE according to the processing indication information, wherein before the determining, by UE, processing indication information according to a type of buffered uplink data, and generating a BSR, the method further comprises:
   receiving, by the UE, bearer configuration information sent by the eNB, wherein the bearer configuration information comprises a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

6. The transmission data processing method according to claim 5, wherein the processing indication information comprises the second logic channel group identity; and
   the determining, by UE, processing indication information according to a type of buffered uplink data, and generating a BSR comprises:
   if it is learned, by means of determining, that the buffered uplink data comprises low-priority data, generating, by the UE, a BSR carrying the second logic channel group identity.

7. The transmission data processing method according to claim 5, wherein the processing indication information comprises the first logic channel group identity and the second logic channel group identity; and
   the determining, by UE, processing indication information according to a type of buffered uplink data, and generating a BSR comprises:
   if it is learned, by means of determining, that the buffered uplink data comprises low-priority data and high-priority data, generating, by the UE, a BSR carrying the first logic channel group identity and the second logic channel group identity.

8. The transmission data processing method according to claim 5, wherein the processing indication information comprises the first logic channel group identity; and the determining, by UE, processing indication information according to a type of buffered uplink data, and generating a BSR comprises:
   if it is learned, by means of determining, that the buffered uplink data is high-priority data, generating, by the UE, a BSR carrying the first logic channel group identity.

9. User equipment (UE), comprising:
   a receiver configure to receive bearer configuration information sent by an evolved NodeB (eNB), wherein the bearer configuration information indicates high-priority data and low-priority data;
   a processor, configured to determine processing indication information according to a type of buffered uplink data, and generate a buffer status report (BSR), wherein the BSR carries the processing indication information, and if the buffered uplink data comprises low-priority data, generate the BSR carrying processing indication information used to indicate that the uplink data is low-priority data; and
   a transmitter, configured to send the BSR generated by the processor to the evolved NodeB (eNB), so that the eNB performs scheduling and uplink transmission resource allocation on the UE according to the processing indication information.

10. The UE according to claim 9, wherein the BSR is a short BSRt or a truncated BSR, the processing indication information is bit indication information, and content of a reserved bit of a Media Access Control (MAC) layer subheader in the BSR is the bit indication information.

11. The UE according to claim 9, wherein content of a logic channel identity field of a MAC layer subheader of the BSR is the processing indication information.

12. The UE according to claim 9, wherein the low-priority data comprises:
   a machine-to-machine communication service data packet, with a low delay requirement, on a machine communication bearer.

13. User equipment (UE), comprising:
   a processor, configured to determine processing indication information according to a type of buffered uplink data, and generate a buffer status report (BSR), wherein the BSR carries the processing indication information;
   a transmitter, configured to send the BSR generated by the processor to an evolved NodeB (eNB), so that the eNB performs scheduling and uplink transmission resource allocation on the UE according to the processing indication information; and
   a receiver, configured to receive bearer configuration information sent by the eNB, wherein the bearer configuration information comprises a first logic channel group identity and a second logic channel group identity, the first logic channel group identity and the second logic channel group identity are corresponding to a same logic channel group, the first logic channel group identity is used to indicate high-priority data, and the second logic channel group identity is used to indicate low-priority data.

14. The UE according to claim 13, wherein the processing indication information comprises the second logic channel group identity; and
   the processor is configured to: if it is learned, by means of determining, that the buffered uplink data comprises low-priority data, generate a BSR carrying the second logic channel group identity.

15. The UE according to claim 13, wherein the processing indication information comprises the first logic channel group identity and the second logic channel group identity; and the processor is configured to: if it is learned, by means of determining, that the buffered uplink data comprises the low-priority data and the high-priority data, generate a BSR carrying the first logic channel group identity and the second logic channel group identity.

16. The UE according to claim 13, wherein the processing indication information comprises the first logic channel group identity; and the processor is configured to: if it is learned, by means of determining, that the buffered uplink data is high-priority data, generate a BSR carrying the first logic signal group identity.

\* \* \* \* \*

UNITED STATES PATENT AND TRADEMARK OFFICE
CERTIFICATE OF CORRECTION

PATENT NO. : 9,713,030 B2  
APPLICATION NO. : 14/851351  
DATED : July 18, 2017  
INVENTOR(S) : Yongqiang Gao et al.

Page 1 of 1

It is certified that error appears in the above-identified patent and that said Letters Patent is hereby corrected as shown below:

On the Title Page

Item [56] (Other Publications), Column 2, Line 21:
On the line below "International Application No. PCT/CN2013/072451" insert -- Extended European Search Report mailed January 15, 2016 in corresponding European Patent Application No. 13878146.3 -- therefore.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*